US012136528B2

(12) United States Patent
Tan et al.

(10) Patent No.: US 12,136,528 B2
(45) Date of Patent: Nov. 5, 2024

(54) SYSTEM AND METHOD FOR OBTAINING USER INPUT WITH PASSIVE KEYBOARD

(71) Applicant: Dell Products L.P., Round Rock, TX (US)

(72) Inventors: Loo Shing Tan, Singapore (SG); Michiel Sebastiaan Emanuel Petrus Knoppert, Amsterdam (NL); Gerald Rene Pelissier, Mendham, NJ (US); Thomas Marcus Hinskens, Utrecht (NL)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 18/149,812

(22) Filed: Jan. 4, 2023

(65) Prior Publication Data

US 2024/0222045 A1 Jul. 4, 2024

(51) Int. Cl.
*H01H 13/7065* (2006.01)
*G06F 3/02* (2006.01)
*G06F 3/023* (2006.01)

(52) U.S. Cl.
CPC ....... *H01H 13/7065* (2013.01); *G06F 3/0202* (2013.01); *G06F 3/0233* (2013.01); *H01H 2221/04* (2013.01)

(58) Field of Classification Search
CPC .......... H01H 2221/04; H01H 13/7065; H01H 2003/12; H01H 2013/00; H01H 2013/02; H01H 2013/50; H01H 2013/52; H01H 2013/525; H01H 2071/04; H01H 2071/042; H01H 2071/046; H01H 2071/048; H01H 2221/00; H01H 2221/022; H01H 13/14; H01H 13/70; H01H 13/702; H01H 3/12; H01H 3/125; G06F 3/0202; G06F 3/0233
USPC .......................................................... 200/341
See application file for complete search history.

(56) References Cited

U.S. PATENT DOCUMENTS

| | | | |
|---|---|---|---|
| 6,902,332 | B2 | 6/2005 | McLoone |
| 8,368,649 | B2 | 2/2013 | Hall |
| 8,654,095 | B1 | 2/2014 | Cho et al. |
| 9,323,356 | B2 | 4/2016 | Kuo |
| 10,719,145 | B1 | 7/2020 | Files et al. |
| 11,809,646 | B1 | 11/2023 | Knoppert et al. |
| 2005/0083316 | A1 | 4/2005 | Brian et al. |
| 2006/0205368 | A1 | 9/2006 | Bustamante et al. |
| 2007/0171205 | A1 | 7/2007 | Steinberg |
| 2009/0033632 | A1 | 2/2009 | Szolyga et al. |

(Continued)

FOREIGN PATENT DOCUMENTS

WO WO-2007114631 A2 * 10/2007 ......... H01H 13/7065

*Primary Examiner* — Anthony R Jimenez
(74) *Attorney, Agent, or Firm* — Womble Bond Dickinson (US) LLP (57) ABSTRACT

Methods and systems for providing computer implemented services using user input are disclosed. To obtain the user input, a passive human interface device may be used. The human interface device may include any number of magnets that may produce a magnetic field used to discern the user input. The magnets may be mechanically coupled to actuatable elements of the human interface device thereby encoding information regarding actuations of the human interface device into the magnetic field produced by the magnets. The magnetic field may be sensed and used to identify actuations by the user which may indicate input from the user.

20 Claims, 8 Drawing Sheets

(56) References Cited

U.S. PATENT DOCUMENTS

| | | |
|---|---|---|
| 2010/0053085 A1 | 3/2010 | Hall |
| 2012/0038496 A1 | 2/2012 | Edwards |
| 2013/0314338 A1 | 11/2013 | Nam et al. |
| 2014/0184505 A1 | 7/2014 | Fullerton et al. |
| 2014/0267150 A1 | 9/2014 | Masashi |
| 2015/0277598 A1 | 10/2015 | Aurongzeb et al. |
| 2016/0041678 A1 | 2/2016 | Wu |
| 2016/0299606 A1 | 10/2016 | Go |
| 2016/0313819 A1 | 10/2016 | Ancona et al. |
| 2018/0314316 A1* | 11/2018 | Xu ................... G06F 1/1677 |
| 2019/0113966 A1 | 4/2019 | Connellan et al. |
| 2019/0187856 A1 | 6/2019 | Bruwer et al. |
| 2019/0339776 A1 | 11/2019 | Rosenberg et al. |
| 2020/0004346 A1 | 1/2020 | Vlasov et al. |
| 2020/0371625 A1 | 11/2020 | Katsurahira et al. |
| 2022/0352635 A1 | 11/2022 | Compton |

* cited by examiner

SYSTEM AND METHOD FOR OBTAINING USER INPUT WITH PASSIVE KEYBOARD

FIELD

Embodiments disclosed herein relate generally to user input in computing systems. More particularly, embodiments disclosed herein relate to systems and methods to obtain user input.

BACKGROUND

Computing devices may provide computer implemented services. The computer implemented services may be used by users of the computing devices and/or devices operably connected to the computing devices. The computer implemented services may be performed using input from users. For example, users of computing devices may provide input as part of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, user input may be obtained.

To obtain the user input, a human interface device may be used. The human interface device may be actuated by a user, and the actuations may be translated into magnetic fields detectable by a sensing system.

A sensing system may sense the magnetic fields and obtain information reflecting changes in the position and/or orientation of magnets of the human interface device that generate the magnetic fields. Thus, information reflecting actuations of the human interface device by the user may be encoded in the magnetic fields and may be sensed.

The obtain information may then be used to identify, for example, user input provided by the user. For example, the information regarding changes in the position and/or orientation of the magnets may be translated into user input. The user input may then be used to drive computer implemented services.

For example, the user input may be provided by the user to activate certain functionalities, change functionalities, terminate functionalities, and/or invoke desired activities by a data processing system.

By using a magnet and mechanical linkage to the magnet, the human interface device may not need to be powered, may include fewer components thereby reducing the likelihood of component failures, may be made lighter/smaller thereby reducing loads placed on user of user input devices, etc.

To obtain the user input, a map of the human interface device may be established. The map may associate changes in magnetic field with actuations of the actuatable elements of the human interface device. Thus, when subsequent changes in the magnetic field emanating from the human input device are obtained, corresponding actuations may be identified. The actuations may be translated into commands or other types of user input.

By doing so, a system in accordance with embodiments disclosed herein may have improved portability and usability when compared to other types of devices used to obtain user input that may be powered. Thus, embodiment disclosed herein may address, among others, the technical challenge of loads placed on users during acquisition of user input and mechanical or electrical failure of devices tasked with obtaining user input.

In an embodiment, a user input system in accordance with an embodiment my include a body; a keycap; a magnet positioned with the keycap; and a deformable element separating the magnet from the body, the deformable element adapted to translate between two positions, in a first position of the two positions the magnet is a first distance from the body and in a second position of the two positions the magnet is a second distance from the body, and the first distance being larger than the second distance.

The deformable element may be further adapted to return to the first position while an actuation force is not applied to the keycap, and transition to the second position while the actuation force is applied to the keycap.

The magnet may be a permanent magnet.

The user input system may also include a sensing system adapted to: sense a magnetic field emanating from the magnet; and translate the magnetic field into a user input.

Translating the magnetic field into the user input may include performing a lookup in a data structure that is keyed to the magnetic field, the lookup returning an identity of a key inferred as being depressed by the user based on the sensed magnetic field.

Translating the magnetic field into the user input may further include, prior to sensing the magnetic field emanating from the magnet: establishing a map, the map associating a change in the magnetic field associated with the magnet with the key.

Establishing the map may include obtaining, using magnetic field sensing elements of the sensing system, samples of an aggregate magnetic field emanating from the magnet and other magnets positioned with other keycaps of the user input system; identifying, based on the samples, offsets between locations of the magnetic field sensing elements and the magnets comprising the magnet and the other magnets; and obtaining the map based on the offsets.

Establishing the map may also include, prior to obtaining the map, performing a validation of accuracy of the offsets to identify an offset that is inaccurate; and updating the offset that is inaccurate.

The sensing system may also include a matt; and a magnetic field sensing element positioned with the matt.

The sensing system may also include a data processing system; and a magnetic field sensing element positioned with a case of the data processing system.

In an embodiment, a data processing system is provided. The data processing system may include a user input system as discussed above, a processor, and a memory coupled to the processor to store instructions, which when executed by the processor, cause the processor to perform operations for obtaining user input using data obtained from the user input system.

In an embodiment, a non-transitory media is provided. The non-transitory media may include instructions that when executed by a processor operations for obtaining user input using data obtained from the user input system, as discussed above.

Figure 1:
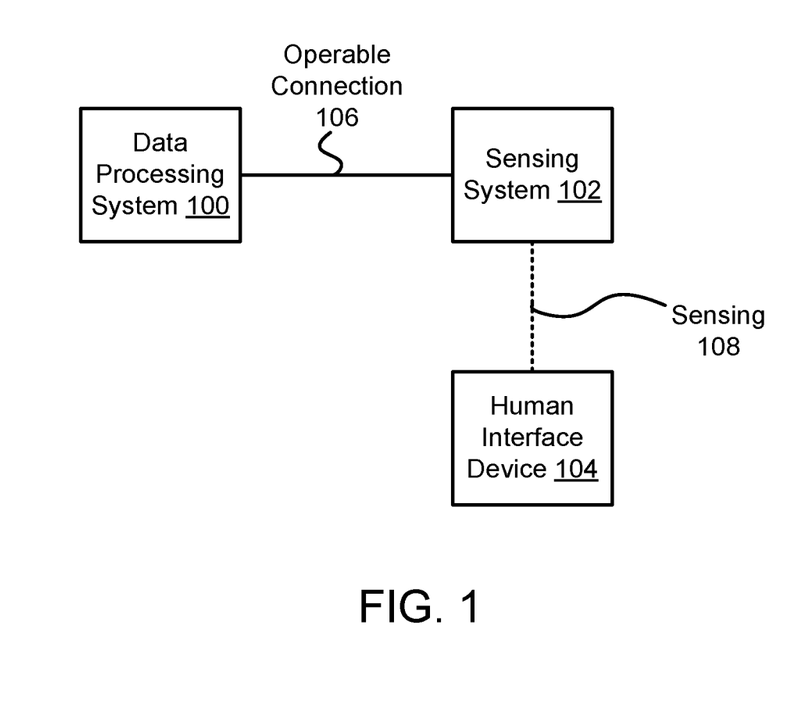
FIG. 1 shows a block diagram illustrating a system in accordance with an embodiment.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, user input may be obtained. The user input may indicate, for example, how the computer implemented services are to be provided. The user input may include any type and quantity of information.

To obtain the user input, a user may perform physical actions such as, for example, pressing buttons, moving structures, etc. These physical actions (and/or results of the actions) may be sensed by various devices, and the sensing may be interpreted (e.g., translated) into the user input (e.g., data).

However, sensing physical actions by a user may involve use of sensors and/or devices that may consume power. The weight of the devices and forces applied by sources of the consumed power (e.g., batteries, cords to power supplies, etc.) or communication cables may place a load (e.g., mechanical) on the user attempting to perform the physical actions. The mechanical load may fatigue the user, reduce the portability of the devices, increase the likelihood of failure of the devices due to increased component count, may needlessly duplicate various components, and/or may be undesirable for other reasons.

In general, embodiments disclosed herein may provide methods, systems, and/or devices for obtaining user input and/or using the obtained user input to provide computer implemented services. To provide the computer implemented services, a system may include data processing system 100.

Data processing system 100 may include hardware components usable to provide the computer implemented services. For example, data processing system 100 may be implemented using a computing device such as a laptop computer, desktop computer, portable computer, and/or other types of computing devices.

Data processing system 100 may host software that may use user input to provide the computer implemented services. For example, the software may provide user input fields and/or other elements through which the user may provide information to manage and/or use the computer implemented services provided by data processing system 100.

To obtain the information from the user, data processing system 100 may obtain signals and/or data from sensing system 102 (e.g., via operable connection 106). Data processing system 100 may interpret (e.g., translate) the signals (e.g., may be analog, data processing system 100 may include an analog to digital converter) and/or data (e.g., digital data) to obtain the user input.

Sensing system 102 may track (e.g., by sensing 108) and/or provide information regarding tracking of human interface device 104, and provide the signals and/or data to data processing system 100. A user may physically interact with human interface device 104, thereby allowing the signals and/or data provided by sensing system 102 to include information regarding the physical actions of the user. While described in FIG. 1 with respect to a single human interface device, it will be appreciated that sensing system 102 may track and provide information regarding any number of human interface devices without departing from embodiments disclosed herein.

For example, if a user actuates an element of human interface device 104, sensing system 102 may track the actuation and provide signals and/or data reflecting the actuation. The element may be, for example, a button, scroll control, or other type of structure which a user may manually actuate to provide the user feedback.

To track human interface device 104, sensing system 102 may include one or more sensors that sense a magnetic field emanating from human interface device 104. The sensors may use the sensed magnetic field to track a location (absolute or relative) and/or orientation (absolute or relative) of any number of magnets embedded in human interface device 104. The magnets may be mechanically coupled to actuatable elements of human interface device 104 thereby encoding user feedback in the sensed magnetic field. The sensors may generate the signals and/or data provided by sensing system 102 to data processing system 100. The sensors may sense the magnitude and/or direction of the magnetic field that passes proximate to each sensor. By knowing the relative placements of the sensors with respect to one another, the positions and/or orientations of the magnets may be identified based on the sensed magnetic fields to which the sensors are exposed (e.g., the magnetic field may be treated as emanating from magnets with known dimensions and/or strength, and/or other assumptions may be made to deduce the locations and/or orientations of the magnets).

Sensing system 102 may also include, for example, analog to digital converters, digital signal processing devices or other signal processing devices (e.g., also referred to as a "signal processing chain"), and/or other devices for generating the signals and/or data based on information obtained via the sensors. Sensing system 102 may also include, for example, software (e.g., firmware) that may facilitate testing and/or validation that signals obtained from a human interface device are being interpreted as expected by the user. For example, the software may orchestrate an interactive testing process where a user actuates a human interface device and indicates whether the actuation has been interpreted by sensing system 102 as expected by the user.

In an embodiment, sensing system 102 is integrated with a data processing system 100. For example, sensing system 102 may be integrated with a case or other portion of data processing system 100.

In an embodiment, sensing system 102 is integrated as an independent device operably connected to data processing system 100. For example, sensing system 102 may be implemented as part of a matt or other structure on which human interface device 104 may be positioned on or nearby.

Human interface device 104 may be implemented with a physical device that a user may actuate in one or more ways. For example, human interface device 104 may (i) may include one or more buttons, (ii) may include one or more scroll controls or other controls, and/or (iii) may include other actuatable elements. Actuating human interface device 104 may change the orientation and/or position of one or more magnets positioned therein with respect to the sensors of sensing system 102.

For example, when buttons or other actuatable elements of human interface device 104 are actuated, the magnet may be moved or rotated (e.g., in one or more planes) thereby changing the strength and/or direction of the magnetic field sensed by sensors of sensing system 102. Refer to FIGS. 2A-2F for additional details regarding sensing of human interface device 104.

Human interface device 104 may be a passive device. For example, human interface device 104 may not consume power, include batteries or sensors (or other components that may consume power during operation), etc. Rather, to convey information to sensing system 102, human interface device 104 may include one or more permanent magnets mechanically coupled to actuatable elements, such as buttons. Thus, information regarding actuation of human interface device 104 may be encoded in a static magnetic field produced by the permanent magnets and sensed by sensing system 102. Consequently, human interface device 104 may be of smaller size, lower weight, and/or may provide other advantages when compared to active devices such as a powered keyboard that may need batteries or access to a power supply for operation. Refer to FIGS. 2A-2F for additional details regarding human interface device 104.

Data processing system 100 may perform a lookup or other type of operation to translate the signals and/or data from sensing system 102 into user input. Once obtained, the user input may be used to drive downstream processes.

Figure 3:
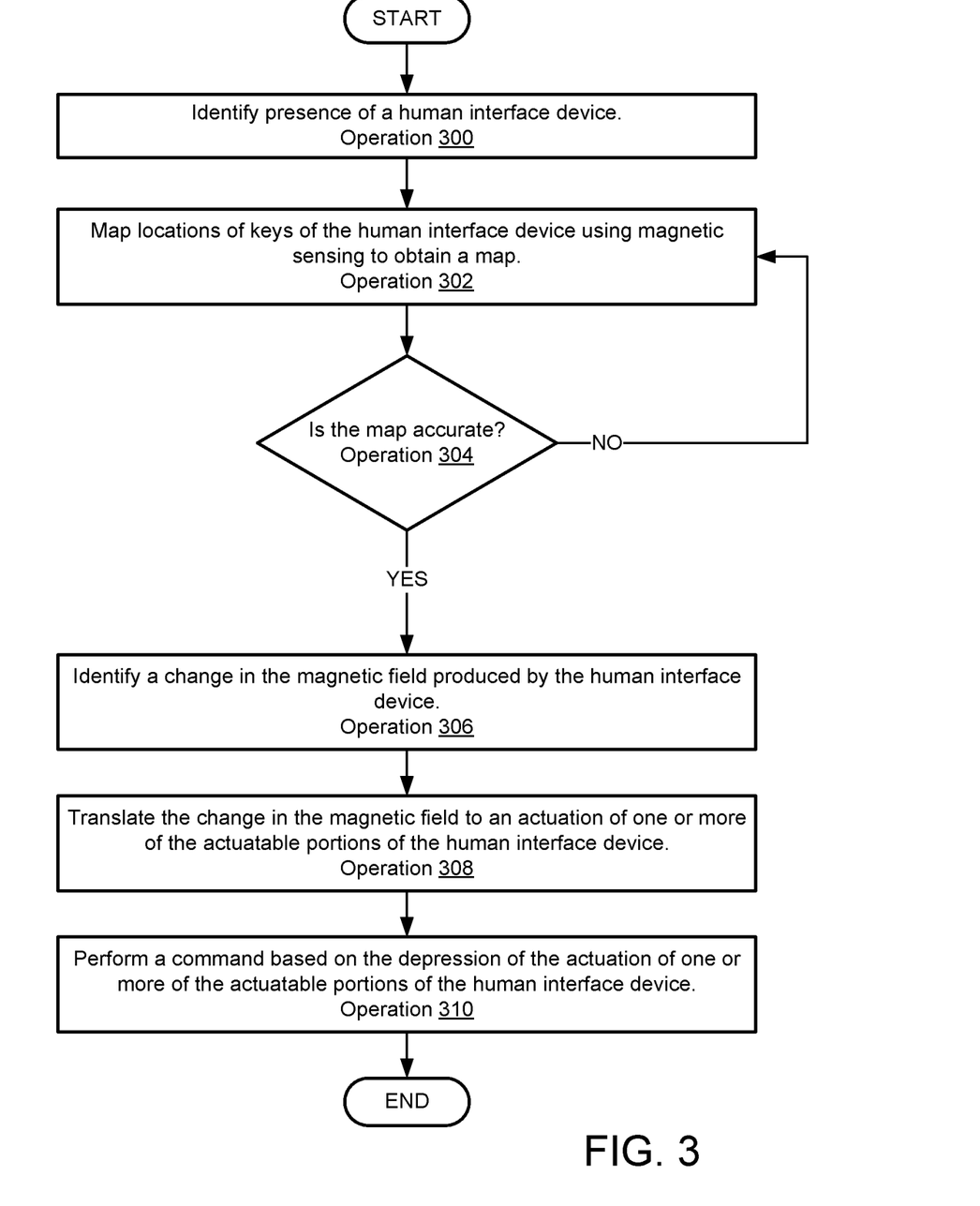
FIG. 3 shows a flow diagram illustrating a method of obtaining user input and providing computer implemented services in accordance with an embodiment.

When providing its functionality, data processing system 100 and/or sensing system 102 may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated). For example, sensing system 102 may be operably connected to data processing system 100 via a wired (e.g., USB) or wireless connection. Sensing system 102 may include a chipset or other component to implement and provide an interface to data processing system 100 via the wired and/or wireless connection. The interface of sensing system 102 may be connected to, for example, any number of sensing arrays and/or sensing elements of sensing system 102, and/or other components (e.g., signal processing chains, etc.) thereby allowing the interface to obtain user input provided by the user via human interface device 104.

As noted above, human interface device 104 may not be operably connected to other devices (e.g., may be a passive device), but may be sensed by sensing system 102 via sensing 108. For example, during sensing 108, a static magnetic field emanating from human interface device 104 may be sensed by sensing system 102 to obtain the user input.

While illustrated in FIG. 1 as included a limited number of specific components, a system in accordance with an embodiment may include fewer, additional, and/or different components than those illustrated therein.

Figure 2A:
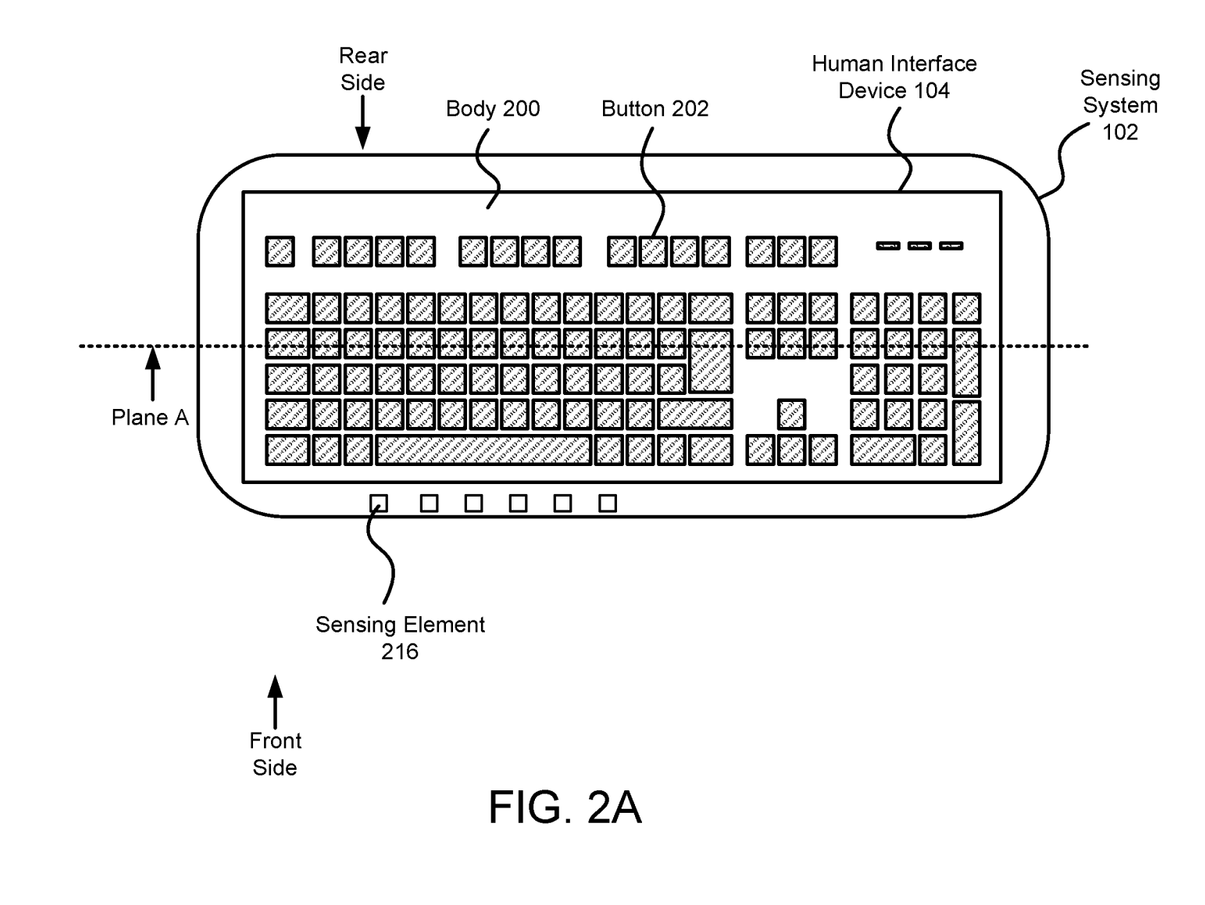
FIG. 2A shows a diagram illustrating a human interface device and sensing system in accordance with an embodiment.
Figure 2B:
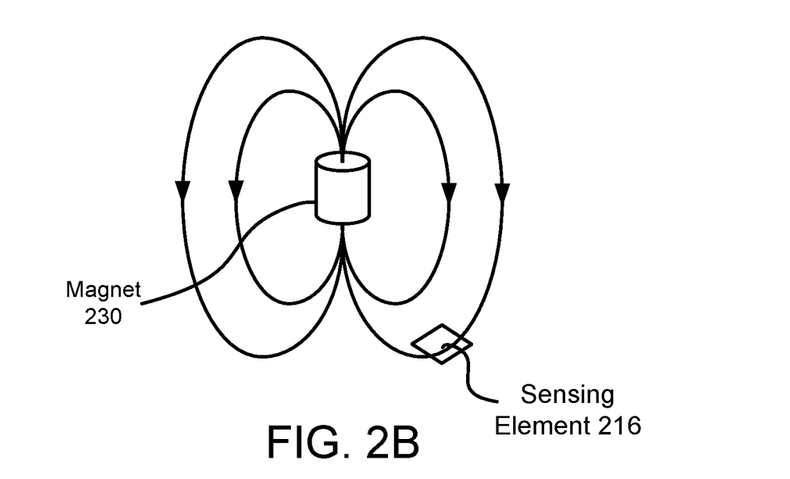
FIGS. 2B-2C show diagrams illustrating field sensing in accordance with an embodiment.
Figure 2C:
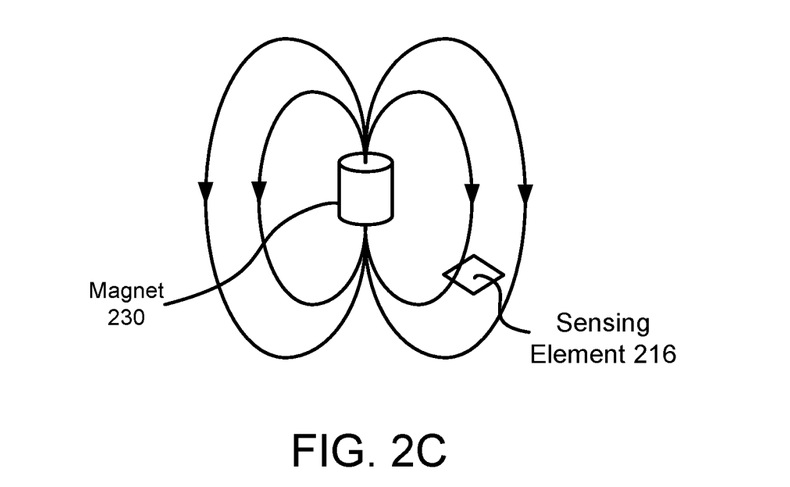

To further clarify embodiments disclosed herein, diagrams illustrating sensing of human interface device 104 by sensing system 102 in accordance with an embodiment are shown in FIGS. 2A-2C.

Figure 2D:
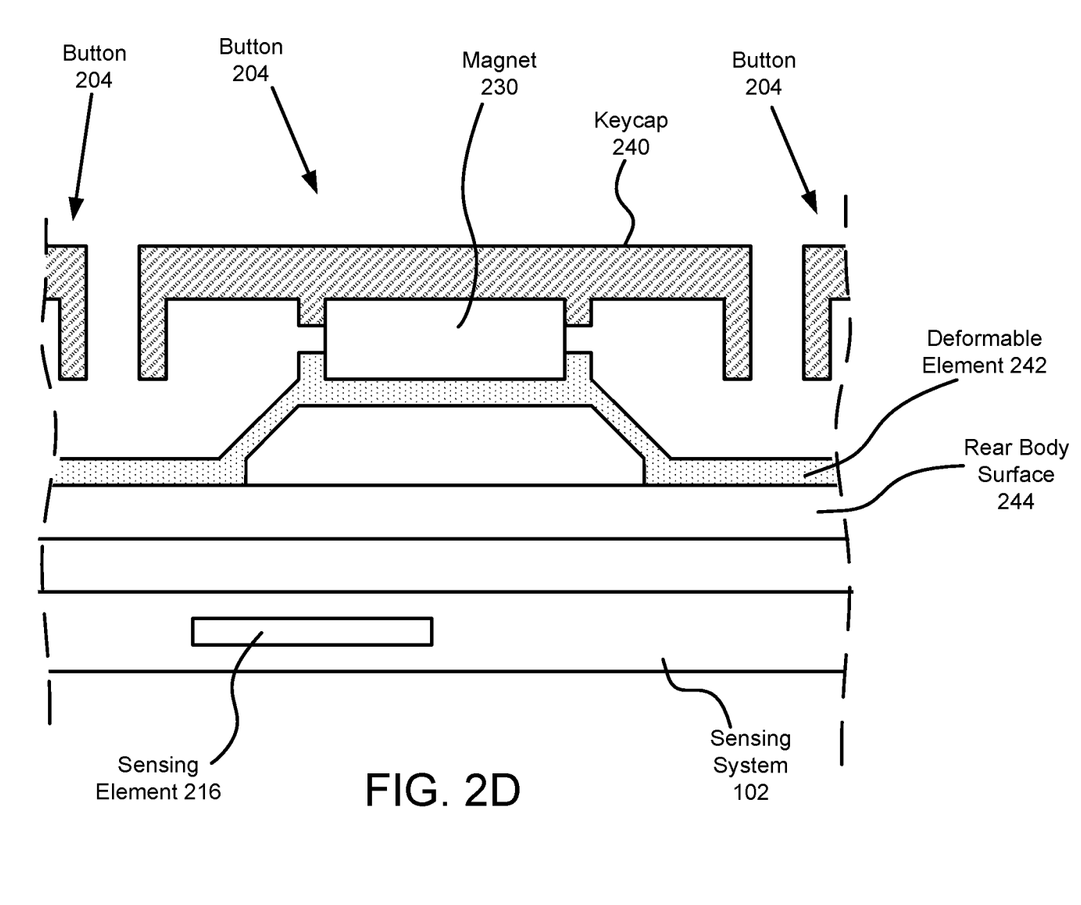
FIGS. 2D-2F show diagrams illustrating sensing of human interface devices in accordance with an embodiment.

Turning to FIG. 2A, a diagram of an example implementation of sensing system 102 and human interface device 104 in accordance with an embodiment is shown. As discussed above, sensing system 102 may be implemented, for example, as a matt on which human interface device 104 is positioned. Sensing system 102 may include any number of sensing elements which may sense a magnetic field distribution generated by human interface device 104. Sensing system 102 may be implemented using other form factors and/or integrated into other devices. Refer to FIG. 2F for additional information regarding implementation of sensing system 102.

Human interface device 104 may provide the functionality of a keyboard. To provide this functionality, human interface device 104 may include body 200, and buttons (e.g., 202) corresponding to keys of the keyboard (and/or other types of interface elements such as scroll wheels, etc.).

Body 200 may be implemented using a case or other type of structure in which various components may be placed on and/or inside thereof. For example, the case may have a shape and size of a keyboard case which may include various portions (e.g., such as plastic parts produced through forming processes such as injection molding). Body 200 may include a surface on which buttons (e.g., 202) may be positioned.

Body 200 may also include an interior region in which various components may be positioned. These components may include (i) permanent magnets, and (ii) mechanical linkages that may facilitate translation of corresponding permanent magnets when various buttons are actuated by a user. The mechanical linkages may generally facilitate translation of the permanent magnets between two positions. When so moved, the permanent magnets may change the magnetic field distribution emanating from human interface device 104, thereby allowing sensing elements positioned with sensing system 102 to detect that the respective buttons have been actuated. The mechanical linkages may also tend to return each of the magnets to a resting position when force is not applied to a corresponding button.

Button 202 may be implemented with, for example, (i) a keycap which a user may press to provide user feedback, (ii) a corresponding permanent magnet attached to the keycap, (iii) a corresponding mechanical linkage, and/or (iv) other types of components for enabling a user to provide user input. Human interface device 104 may include any number of button 202 and/or other components which a user may actuate to provide user feedback. Refer to FIGS. 2B-2D for additional details regarding obtaining user feedback via human interface device 104.

Sensing element 216 may be implemented with a sensor. The sensor may include functionality to measure an intensity and direction of a magnetic field to which sensing element 216 is exposed. Sensing system 102 may include any number of sensing elements 216.

In an embodiment, the sensing elements are organized into different arrays. Each of the arrays may include similar or different numbers and/or types of sensing elements (each array may be homogenous or heterogenous with respect to sensing element type, different types of sensing elements may have different capabilities such as a noise floor). While illustrated in FIG. 2A with respect to specific positions, the sensing elements may be positioned elsewhere without departing from embodiments disclosed herein.

While illustrated in FIG. 2A as having specific shapes and sizes, it will be appreciated that the shapes of sensing elements (e.g., 216) are merely illustrative and the shapes may be different without departing from embodiments disclosed herein.

Turning to FIGS. 2B-2C, diagrams illustrating a magnet (e.g., 230) and sensing element 216 in accordance with an embodiment are shown. As noted above, human interface device 104 may include any number of magnet 230 (e.g., a permanent magnet). For example, one magnet may be integrated with each actuatable element of human interface device 104. Magnet 230 may project a magnetic field. In these figures, the magnetic field is illustrated using lines with arrows superimposed over the midpoints of the lines. The direction of the arrow indicates and orientation of the field.

As seen in FIG. 2B, when magnet 230 is positioned above (e.g., within a predetermined distance range, which may vary depending on the strength of magnet 230 and sensitivity level of sensing element 216) sensing element 216, the magnetic field may be of sufficient strength to be measurable by sensing element 216 but may be somewhat attenuated. Sensing element 216 may utilize any sensing technology to measure the magnitude and/or the orientation of the magnetic field at its location. Due to the magnetic field distribution of magnet 230, the magnitude and orientation of the magnetic field at the location of sensing element 216 may be usable to identify, in part, the location and orientation of magnet 230 (and/or positions/orientations of multiple magnetics that project an aggregate magnetic field, for example, in multiple buttons positioned next to one another).

For example, when magnet 230 is moved towards sensing element 216 as shown in FIG. 2C from the orientation as shown in FIG. 2B, the direction and/or magnitude of the magnetic field at the location of sensing element 216 may change. By identify the magnitude and orientation of the magnetic field at a number of locations (e.g., corresponding to different sensing elements), the position and orientation of any number of magnet 230 may be identified.

To utilize the location and orientation of the magnet embedded in human interface device 104 to obtain user input, magnet 230 may be mechanically coupled to the actuatable elements of the human interface device. By doing so, information regarding actuation of the human interface device by a user may be encoded into the magnetic field projected by magnet 230 and sensed by sensing element 216.

Figure 2E:
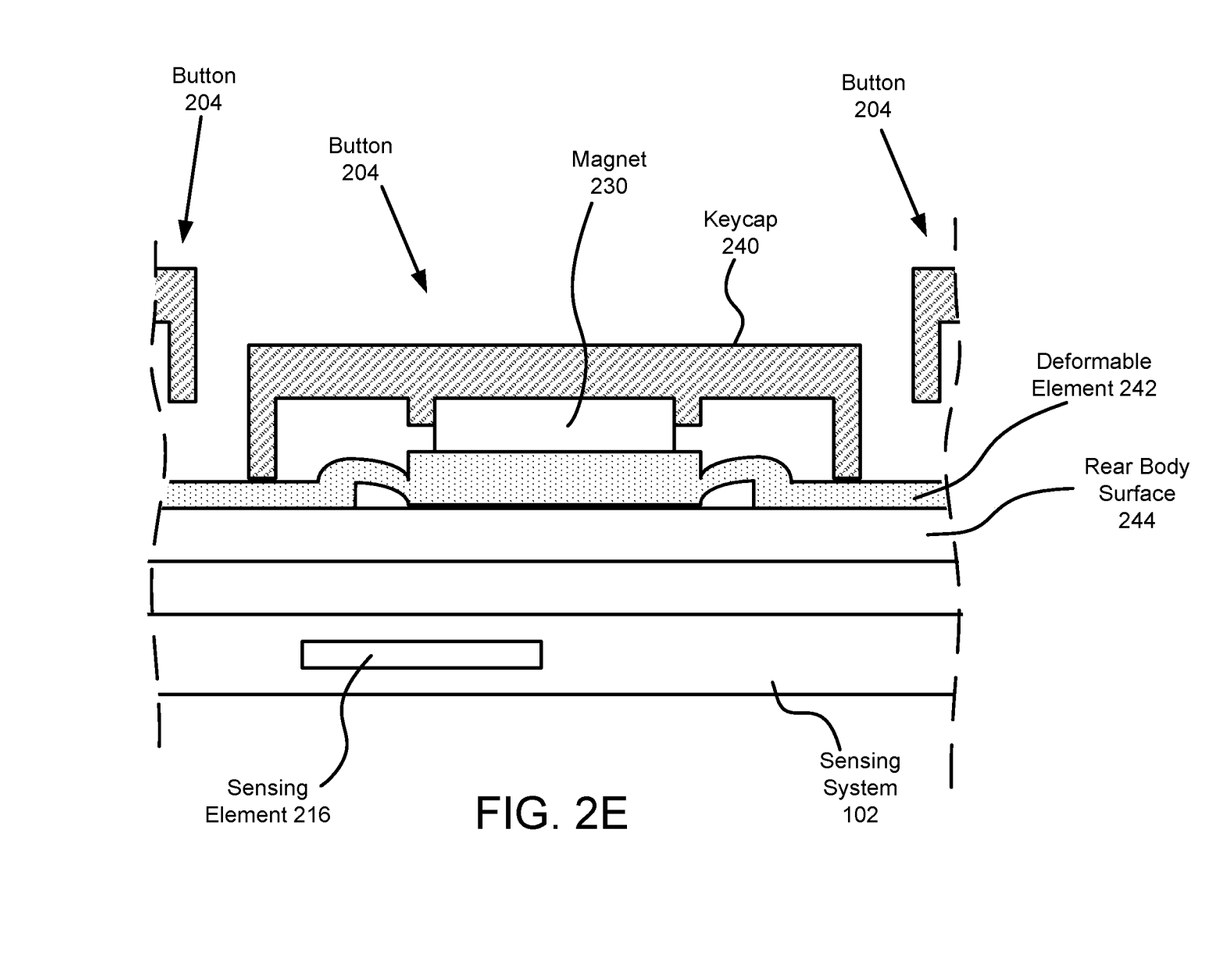
Figure 2F:
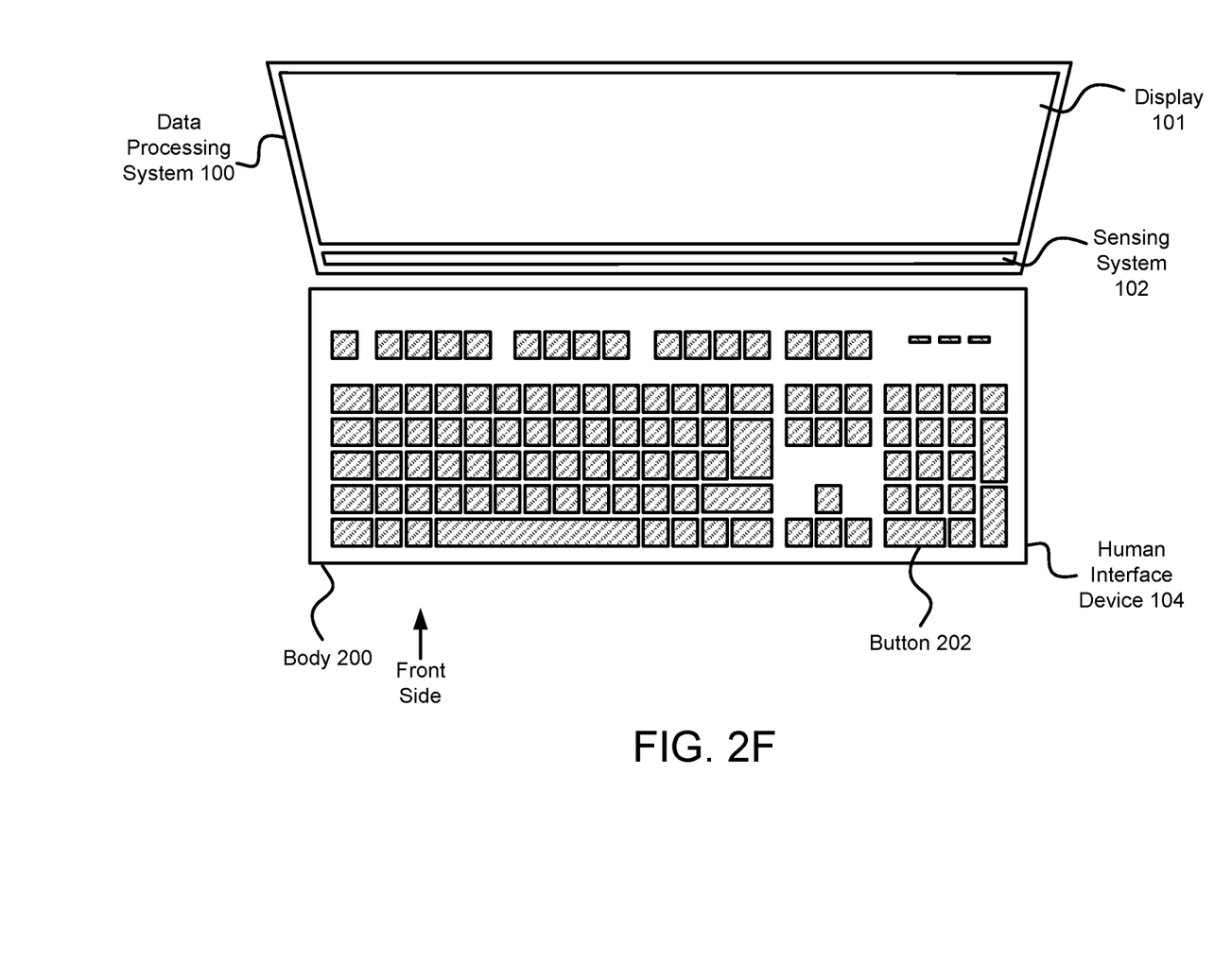

Turning to FIGS. 2D-2E, diagrams illustrating cross section views of human interface device 104 and sensing system 102 in Plane A in accordance with an embodiment are shown. In the figures, the wavy lines towards the edges of the diagram indicate that the structures may continue.

To provide information regarding actuation of human interface device 104, magnet 230 may be attached to a bottom side of keycap 204. Keycap 204 may be a top of a button, and may include, for example, symbols or other depictions which a user may read to understand the type of input that is provided when the user actuates the button.

Magnet 230 and keycap 240 may be attached to a rear body surface 244 of body 200 by a mechanical linkage. The mechanical linkage may include deformable element 242. Deformable element 242 may facilitate reversible translation of keycap 240 and magnetic 230 between two positions.

In a first position, keycap 240 may extend outward from body 200 (e.g., to present a key that a user may press). FIG. 2D is shown with keycap 240 and magnet 230 in the first position.

In a second position, keycap 240 may be recessed toward body 200 (e.g., to indicate to the user that the key has been pressed). FIG. 2E is shown with keycap 240 and magnet 230 in the second position.

Deformable element 242 may be implemented with, for example, a collapsible rubber dome. The collapsible rubber dome may be made of an elastic material that may tend to return (while force is not applied to keycap 240) to a shape that positions keycap 240 and magnet 230 in the first position. The collapsible rubber dome may include, for example, walls or other elements that may deform when a sufficient level of force is applied to keycap 240 thereby allowing keycap 240 and magnet 230 to translate to the second position.

Through translation and/or rotation of the magnets, sensing elements (e.g., 216) positioned nearby may sense the changes in magnetic field emanating from any number of magnet 230 positioned in human interface device 104 to identify which of the buttons and/or other actuatable elements have been actuated.

While illustrated in FIGS. 2D-2E with a limited number of specific components, a human interface device and/or sensing system may include additional, fewer, and/or different components without departing from embodiments disclosed herein.

Additionally, while illustrated in FIGS. 2D-2E as being placed on sensing system 102, it will be appreciated that sensing system 102 may be positioned in different locations with respect to human interface device 104.

For example, turning to FIG. 2F, a diagram of an example implementation of sensing system 102 and human interface device 104 in accordance with an embodiment is shown. In FIG. 2A, sensing system 102 is integrated with data processing system 100.

For example, data processing system 100 may be implemented as a portable computing device having display 101. Sensing system 102 may be implemented into the case or body of data processing system 100.

Consequently, when positioned near human interface device 104, sensing system 102 may sense the changes in the positions and/or orientations of the magnets of human interface device 104 thereby allowing for key presses to be identified.

As discussed above, the components of FIG. 1 may perform various methods to provide computer implemented services using user input. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of obtaining user input in accordance with an embodiment is shown. The method may be performed by data processing system 100, sensing system 102, human interface device 104, and/or other components of the system of FIG. 1.

At operation 300, presence of a human interface device is identified. The presence of the human interface device may be identified by sensing the presence of the magnetic field produced by the magnets of the human interface device.

At operation 302, locations of keys of the human interface device are mapping using magnetic sensing to obtain a map. The locations may be mapped by (i) sensing, using magnetic field sensing elements, the magnetic field emanating from the human interface device, (ii) calculating, based on the sensing, spatial offsets between the buttons of the human interface device and the magnetic field sensing elements, and (iii) generating a lookup table so that changes in the magnetic field sensed by the magnetic field sensing elements may return corresponding keys of the human interface device.

The offsets may be calculated, for example, by identifying an outline of the keyboard based on magnetic field strength reported by the sensing elements. The outline of the keyboard may be used to identify (e.g., by identifying where the field strength weakens) a layout of the magnets (e.g., may be looked up in a data structure that associates different outlines with different layouts). Once the layout is identified, offsets and/or other types of factors may be calculated such that the lookup table may be generated so that changes in magnetic field sensing reported by a sensing element may be translated into actuations of a key (e.g., button, slider bar, etc.) of the human interface device.

At operation 304, a determination is made regarding whether the map is accurate. The determination may be made by implementing a test procedure where (i) a user actuates a key, (ii) information regarding which key is believed to had been actuated based on the changes in the magnetic field is displayed to the user, and (iii) the user may provide feedback regarding whether the information is accurate. If the user indicates that the information is inaccurate, then the map may be determined as being inaccurate. If the user indicates that the information is accurate, then the map may be determined as being accurate.

If the map is accurate, then the method may proceed to operation 306. Otherwise, the method may return to operation 302.

At operation 306, a change in the magnetic field produced by the human interface device is identified. The change may be identified by obtaining measurements of a magnetic field emanating from the human interface device, and (ii)

At operation 308, the change in the magnetic field is translated into an actuation of one or more actuatable portions. The change may be translated by using the map to identify whether any and which buttons or other elements of the human interface device have been pressed. A command (or multiple) may be identified based on the pressed buttons.

At operation 310, a command is performed based on the actuation of the one or more actuatable portions. The command may be performed, for example, by an operating system passing through or otherwise providing information regarding the command to an application or other consumer of the user input. The consumer may then take action based on the command.

For example, a data processing system may host an operating system, drivers, and/or other executing entities that may take responsibility for translating signals/data from a sensing system into commands or other types of user input. The resulting commands may then be passed through to other entities for consumption.

The method may end following operation 310.

Thus, using the method illustrated in FIG. 3, embodiments disclosed herein may facilitate obtaining user input and using the user input to provide computer implemented services. By obtaining the user input via a passive device (at least with respect to user input), a human interface device in accordance with embodiments disclosed herein may be of lower complexity thereby improving the likelihood of continued operation, may not be dependent on power sources, may not require as large of physical loads to be exerted by users, and may provide other benefits.

Figure 4:
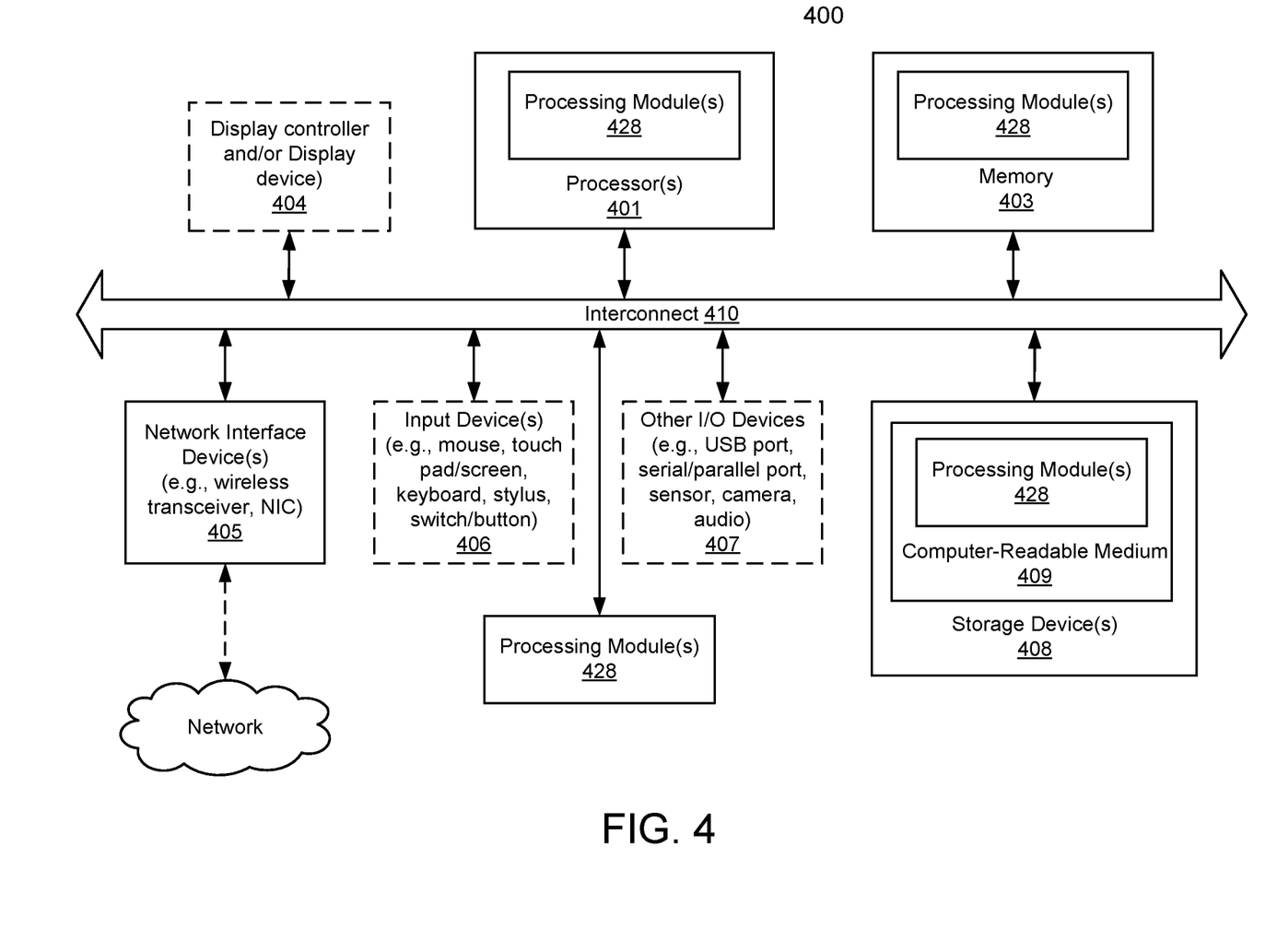
FIG. 4 shows a block diagram illustrating a data processing system in accordance with an embodiment.

Any of the components illustrated in FIGS. 1-2F may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac Os®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A user input system, comprising:
    a body;
    a keycap;
    a magnet that is directly attached to the keycap;
    a deformable element that is directly attached to the body and that separates the magnet from the body, the magnet also being directly attached to the deformable element, the deformable element adapted to translate between two positions, in a first position of the two positions the magnet is a first distance from the body and in a second position of the two positions the magnet is a second distance from the body, and the first distance being larger than the second distance.

2. The user input system of claim 1, wherein the magnet is a permanent magnet, the magnet is directly attached to the keycap via a first surface of the magnet, and the magnet is directly attached to the deformable element via a second surface of the magnet that is opposite to the first surface.

3. The user input system of claim 1, wherein the deformable element is a collapsible dome and is further adapted to return to the first position while an actuation force is not applied to the keycap and to transition to the second position while the actuation force is applied to the keycap.

4. The user input system of claim 2, wherein the collapsible dome is a collapsible rubber dome.

5. The user input system of claim 1, further comprising:
    a sensing system adapted to:
        sense a magnetic field emanating from the magnet; and
        translate the magnetic field into a user input.

6. The user input system of claim 5, wherein the sensing system comprises:
    a matt; and
    a magnetic field sensing element positioned with the matt.

7. The user input system of claim 5, wherein translating the magnetic field into the user input comprises:
    performing a lookup in a data structure that is keyed to the magnetic field, the lookup returning an identity of a key inferred as being depressed by the user based on the sensed magnetic field.

8. The user input system of claim 7, wherein translating the magnetic field into the user input further comprises:
    prior to sensing the magnetic field emanating from the magnet:
        establishing a map, the map associating a change in the magnetic field associated with the magnet with the key.

9. The user input system of claim 8, wherein establishing the map comprises:
    obtaining, using magnetic field sensing elements of the sensing system, samples of an aggregate magnetic field emanating from the magnet and other magnets positioned with other keycaps of the user input system;
    identifying, based on the samples, offsets between locations of the magnetic field sensing elements and the magnets comprising the magnet and the other magnets; and
    obtaining the map based on the offsets.

10. The user input system of claim 9, wherein establishing the map further comprises:
  prior to obtaining the map, performing a validation of accuracy of the offsets to identify an offset that is inaccurate; and
  updating the offset that is inaccurate.

11. A data processing system, comprising:
  a user input system comprising:
    a keyboard comprising:
      a body;
      a keycap;
      a magnet that is directly attached to the keycap;
      a deformable element that is directly attached to the body and that separates the magnet from the body, the magnet also being directly attached to the deformable element, the deformable element adapted to translate between two positions, in a first position of the two positions the magnet is a first distance from the body and in a second position of the two positions the magnet is a second distance from the body, and the first distance being larger than the second distance;
  a processor; and
  a memory coupled to the processor to store instructions, which when executed by the processor, cause the processor to perform operations for obtaining the user input using the user input system.

12. The data processing system of claim 11, wherein the deformable element is a collapsible dome and is further adapted to return to the first position while an actuation force is not applied to the keycap and to transition to the second position while the actuation force is applied to the keycap.

13. The data processing system of claim 11, wherein the magnet is a permanent magnet, the magnet is directly attached to the keycap via a first surface of the magnet, and the magnet is directly attached to the deformable element via a second surface of the magnet that is opposite to the first surface.

14. The data processing system of claim 11, wherein the user input system further comprises:
  a sensing system adapted to:
    sense a magnetic field emanating from the magnet; and
    translate the magnetic field into a user input.

15. The data processing system of claim 14, wherein the sensing system comprises:
  a matt; and
  a magnetic field sensing element positioned with the matt.

16. The data processing system of claim 14, wherein the sensing system comprises:
  a magnetic field sensing element positioned with a case of the data processing system.

17. The data processing system of claim 14, wherein translating the magnetic field into the user input comprises:
  performing a lookup in a data structure that is keyed to the magnetic field, the lookup returning an identity of a key inferred as being depressed by the user based on the sensed magnetic field.

18. The data processing system of claim 17, wherein translating the magnetic field into the user input further comprises:
  prior to sensing the magnetic field emanating from the magnet:
    establishing a map, the map associating a change in a magnetic field associated with the magnet with the key.

19. The data processing system of claim 18, wherein establishing the map comprises:
  obtaining, using magnetic field sensing elements of the sensing system, samples of an aggregate magnetic field emanating from the magnet and other magnets positioned with other keycaps of the user input system;
  identifying, based on the samples, offsets between locations of the magnetic field sensing elements and the magnets comprising the magnet and the other magnets; and
  obtaining the map based on the offsets.

20. The data processing system of claim 19, wherein establishing the map further comprises:
  prior to obtaining the map, performing a validation of accuracy of the offsets to identify an offset that is inaccurate; and
  updating the offset that is inaccurate.

* * * * *

UNITED STATES PATENT AND TRADEMARK OFFICE
CERTIFICATE OF CORRECTION

PATENT NO. : 12,136,528 B2
APPLICATION NO. : 18/149812
DATED : November 5, 2024
INVENTOR(S) : Loo Shing Tan et al.

Page 1 of 1

It is certified that error appears in the above-identified patent and that said Letters Patent is hereby corrected as shown below:

In the Claims

Claim 4, Column 14, Line 34, the word "claim 2" should read -- claim 3 --.

Signed and Sealed this
Twenty-first Day of January, 2025

Coke Morgan Stewart
*Acting Director of the United States Patent and Trademark Office*